Nov. 6, 1951  G. R. SPALENY  2,574,129
ROTARY FLUID COUPLING
Filed Oct. 5, 1946

INVENTOR.
George R. Spaleny
BY
*Malcolm W. Fraser*
attorney

Patented Nov. 6, 1951

2,574,129

UNITED STATES PATENT OFFICE 2,574,129

ROTARY FLUID COUPLING

George R. Spaleny, Osborn, Ohio, assignor to Robert B. Haynes, Toledo, Ohio

Application October 5, 1946, Serial No. 701,454

5 Claims. (Cl. 60—54)

This invention relates to power transmission devices, and an object is to produce a simple and efficient fluid coupling having driving and driven parts which can be selectively positioned angularly without militating against the driving relation between the parts.

Another object is to produce a combined hydraulic drive and universal joint in which one part can be disposed at an obtuse angle with respect to the other part and the driving force is hydraulically transmitted from one part to the other.

A further object is to produce a new and improved ball and socket joint in which is incorporated as a part thereof members which enable one part of the joint to be hydraulically driven by the other in selective positions of angular adjustment.

Figure 1:
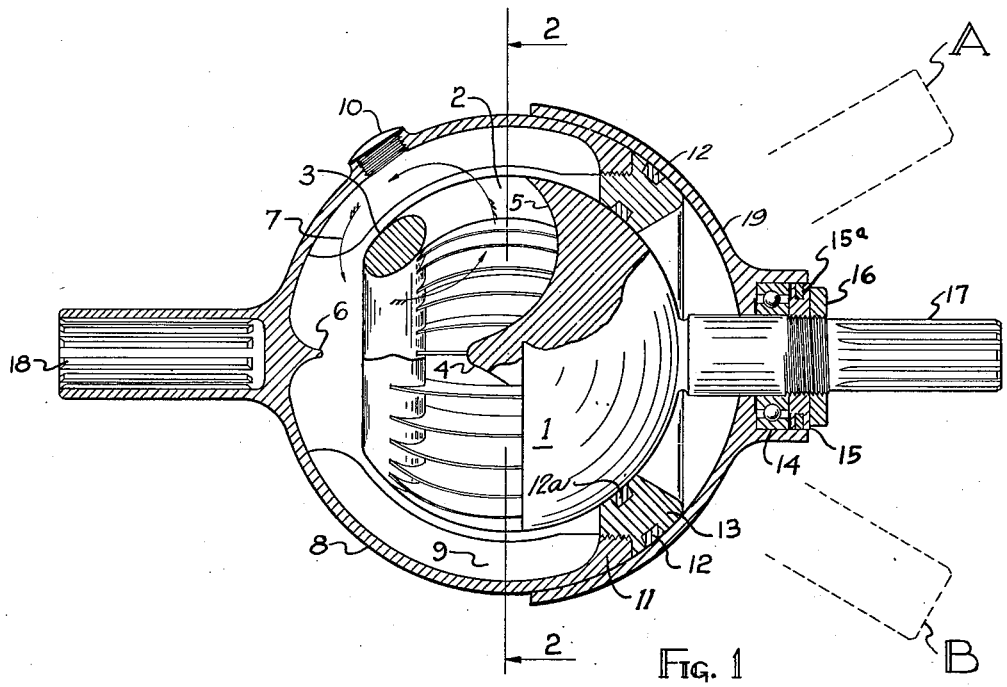
Figure 2:
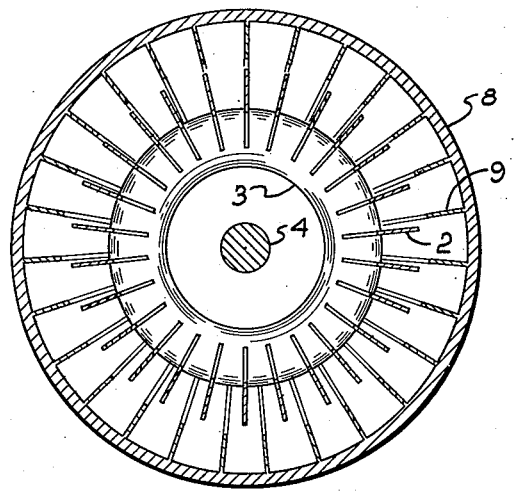

Further objects reside in details of construction, arrangement and operation hereinafter described, and for purposes of illustration but not of limitation, an embodiment of the invention is shown in the accompanying drawing, in which Figure 1 is a longitudinal sectional view partly in elevation of a combined ball and socket universal joint and hydraulic drive; and Figure 2 is a transverse sectional view substantially on the line 2—2 of Figure 1.

The illustrated embodiment of the invention comprises a ball and socket universal joint in which is incorporated a hydraulic drive so that the driving and driven shafts or members can be angularly disposed to each other such, for example, as at an obtuse angle, and there being blades or vanes on the respective joint or coupling members, which rotate relatively to each other in a pool of liquid so that rotative movement of the driving joint member transmits force hydraulically from one set of blades or vanes to the other.

Referring to the drawing, the male coupling member indicated at 1, is in the form generally of a frusto-sphere which is rigid with a splined shaft which may constitute either the driving or driven part as desired. The inner portion of the sphere 1 has rigidly secured thereto an annular series of radially disposed, laterally spaced vanes or blades 2, the outer edge portions of which are curved in conformity with that of the general form of the sphere defined by the outer portion thereof. The vanes 2 are substantially flat and are suitably secured at their inner ends to a ring 3 which is somewhat oval in cross section and has inner and outer surfaces conforming generally to the curvature of the vanes. The ring 3 also serves to reduce the turbulence of the liquid during its movement, which movement is indicated by the arrows 7 on Figure 1.

The inner portion of the sphere has an integral depending curved extension or nose 4 disposed in axially centered relation between the inner edge portions of the vanes 2 and terminating approximately midway between ends of the vanes. It will be observed that the sphere area between adjacent vanes 2 is curvilinear as indicated at 5, the curved surface merging with the curved surface of the depending nose 4, such curved surface being to facilitate the circulation of liquid employed in connection with the hydraulic drive.

The male portion 1 of the coupling, as above described, is disposed within a shell or socket member 8 with which an axially disposed socketed splined extension 18 is integral. Formed on the inside of the shell axially thereof is an integral button or nose 6, which assists in reducing eddy currents in the liquid when the parts are in neutral position. The shell 8 is slightly larger than a hemisphere and is formed at its free end with an internally screw-threaded enlargement 11. In screw-threaded engagement with the enlargement 11 is a shouldered ring 13, the inner portion of which has bearing upon solid portion of the sphere and a suitable packing 12 and 12a in the ring provides a liquid-tight seal with the hood 19 hereinafter described and the sphere respectively. It will be understood that the outer surface of the solid portion of the sphere 1 is smooth and polished, so that the packing 12a and ring can ride readily thereover without interfering with the hydraulic seal.

It will be observed that the diameter of the cup or shell 8 is somewhat greater than that of the frusto-sphere 1 and suitably secured to the inner wall of the shell 8 is an annular row of laterally spaced vanes or blades 9, the inner edges of which terminate short of the outer curved edge portions of the vanes 2. It will be understood that the space between the blades 9 and vanes 2 is at least partially filled with a suitable liquid so that the rotation of one joint or coupling part will transmit through the intermediary of the liquid a driving force to the other coupling part, through the vanes and blades above described, as will be readily understood by those skilled in this art. A screw plug closed filler opening 10 in the shell 8 enables introduction of liquid for this purpose. The theory of operation of hydraulic drives of this character is well-known to those skilled in the art, and detail description thereof is not regarded as necessary in this instance.

A substantially hemispherical cap or hood 19 has a hub which is mounted on a ball bearing unit 14 on the drive shaft 17, a nut 15 engaging a screw-threaded portion of the shaft 17 enables adjustment of the hood relative to the shell 8, and a lock nut 16 holds the nut 15 in the adjusted position. A packing 15a provides a liquid seal between the nut 15 and the hub of the hood 19. The hood 19 is of similar curvature as the shell 8, fits over the free end portion of the shell, and is for the purpose of retaining the shell in the proper position relative to the frusto-sphere 1.

From the above description, it will be manifest that I have produced an exceedingly simple and efficient hydraulic coupling which is embodied in a ball and socket universal joint so that even though the driving and driven shafts are angularly disposed with respect to each other, such, for example, as at an obtuse angle, the driving force may be readily and efficiently transmitted from one to the other. Manifestly either coupling part can serve as a driving part. The broken lines A and B on Figure 1 indicate the maximum angular positions to which one part can be adjusted relative to the other part, it being understood that the extent of movement is limited by the ring 13 and the solid ball-like area with which the hydraulic seal engages. Manifestly, beyond that point the hydraulic seal would be ineffective. Such a device is usable to advantage in a variety of places; in fact, substantially any place where the ordinary universal joint is employed.

It is to be understood that numerous changes in details of arrangement, construction and choice of materials may be effected without departing from the spirit of the invention as defined in the appended claims.

What I claim is:

1. Power transmission device comprising a universal coupling having a substantially spherical ball-like part fitting within a shell part, the parts being capable of relative movement out of axial alignment with each other, impeller vanes rigid with said spherical coupling part and arranged concentrically, blades rigid with the interior of the shell coupling part, an hydraulic seal between the coupling parts, and liquid within the coupling parts so that rotative movement of one part through the vanes and blades will impart corresponding movement to the other part in any one of a number of relative angular positions thereof.

2. Power transmission device as claimed in claim 1, in which means is provided for retaining the coupling parts in assembled relation.

3. Power transmission device as claimed in claim 1, in which a dome-like shell is associated with the spherical ball-like part and fits over the free edge portion of the shell coupling part.

4. Power transmission device comprising a coupling having a substantially ball-like part fitting within a substantially hemispherical shell part with the inner walls being spaced from the outer walls of the ball-like part, an inwardly extending flange on the mouth portion of the shell part, a hydraulic seal between the flange and the outer surface of the ball-like part, the engageable surface of the ball-like part being smooth and curvilinear, an annular row of radially disposed concentric impeller vanes rigid with the portion of the ball-like part disposed within the shell, an annular row of spaced blades fixed to the inner wall of the shell with the inner edges close to but spaced from said impeller vanes, and a liquid substantially filling the space between the impeller vanes and blades so that rotative movement of one part is transmitted hydraulically to the other part.

5. Power transmission device comprising a coupling having a substantially ball-like part fitting within a substantially hemispherical shell part with the inner walls being spaced from the outer walls of the ball-like part, an inwardly extending flange on the mouth portion of the shell part, a hydraulic seal between the flange and the outer surface of the ball-like part, the engageable surface of the ball-like part being smooth and curvilinear, an annular row of radially disposed concentric impeller vanes rigid with the portion of the ball-like part disposed within the shell, the surface of the ball-like part intermediate adjacent impeller vanes being curvilinear and merging into a substantially pointed part projecting axially between the row of impeller vanes, an annular row of spaced blades fixed to the inner wall of the shell with the inner edges close to but spaced from said impeller vanes, and a liquid substantially filling the space between the impeller vanes and blades so that rotative movement of one part is transmitted hydraulically to the other part.

GEORGE R. SPALENY.

REFERENCES CITED

The following references are of record in the file of this patent:

UNITED STATES PATENTS

| Number | Name | Date |
|---|---|---|
| 2,034,302 | Kohler | Mar. 17, 1936 |
| 2,088,818 | Skinner | Aug. 3, 1937 |
| 2,401,376 | Sherman | June 4, 1946 |